(12) United States Patent
Fontijn et al.

(10) Patent No.: US 8,825,684 B2
(45) Date of Patent: Sep. 2, 2014

(54) ARRANGEMENT FOR COMPARING CONTENT IDENTIFIERS OF FILES

(75) Inventors: Wilhelmus Franciscus Johannes Fontijn, Eindhoven (NL); Yuechen Qian, Eindhoven (NL); Alexander Sinitsyn, Eindhoven (NL); Jozef Pieter Van Gassel, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 12/515,970

(22) PCT Filed: Nov. 27, 2007

(86) PCT No.: PCT/IB2007/054798
§ 371 (c)(1),
(2), (4) Date: May 22, 2009

(87) PCT Pub. No.: WO2008/065604
PCT Pub. Date: Jun. 5, 2008

(65) Prior Publication Data
US 2010/0057795 A1    Mar. 4, 2010

(30) Foreign Application Priority Data

Nov. 30, 2006 (EP) ..................................... 06125103

(51) Int. Cl.
*G06F 17/30* (2006.01)
*G06F 7/00* (2006.01)

(52) U.S. Cl.
USPC ............ 707/758; 707/698; 707/699; 707/825

(58) Field of Classification Search
None
See application file for complete search history.

(56) References Cited

U.S. PATENT DOCUMENTS

| 5,440,738 | A | | 8/1995 | Bowman et al. |
| 5,479,654 | A | | 12/1995 | Squibb |
| 5,665,952 | A | * | 9/1997 | Ziarno ........................... 235/380 |
| 5,892,900 | A | * | 4/1999 | Ginter et al. .................... 726/26 |
| 6,061,822 | A | * | 5/2000 | Meyer ........................... 714/758 |

(Continued)

FOREIGN PATENT DOCUMENTS

| EP | 1184787 A1 | 3/2002 |
| JP | 2003085946 A | 3/2003 |
| JP | 2005202357 | 7/2005 |
| JP | 2006215639 | 8/2006 |

OTHER PUBLICATIONS

Anonymous: "Stochastic Identification of Duplicate Computer Files"; ip.com Journal, ip.com Inc., West Henrietta, NY, Dec. 12, 2004, 3 Page Document.

*Primary Examiner* — Jung Kim
*Assistant Examiner* — James J Wilcox

(57) ABSTRACT

File comparing device includes a comparator for comparing a first and second content identifiers, of respective files, with each other. Each file having at least two content identifiers and each content identifier is defined by at least one parameter. In addition a selector is included for selecting, using the parameters of the content identifiers, sub-groups of content identifiers, to increase flexibilities. Calculators calculate functions of the values of the parameters and further comparators compare the functions with thresholds. Content identifiers may be defined by cost and accuracy parameters. Then, calculators calculate first functions of the values of the cost parameters and calculate second functions of the values of the accuracy parameters and further comparators compare the first functions with first thresholds and compare the second functions with second thresholds.

6 Claims, 2 Drawing Sheets

(56) References Cited

U.S. PATENT DOCUMENTS

| | | | |
|---|---|---|---|
| 6,611,814 B1 * | 8/2003 | Lee et al. | 705/7.29 |
| 6,779,021 B1 * | 8/2004 | Bates et al. | 709/206 |
| 6,983,289 B2 * | 1/2006 | Commons et al. | 707/741 |
| 7,080,253 B2 * | 7/2006 | Weare | 713/176 |
| 7,283,954 B2 * | 10/2007 | Crockett et al. | 704/216 |
| 7,356,490 B1 * | 4/2008 | Jacobi et al. | 705/26.8 |
| 7,600,125 B1 * | 10/2009 | Stringham | 713/176 |
| 7,607,582 B2 * | 10/2009 | Vallabh et al. | 235/472.01 |
| 7,844,504 B1 * | 11/2010 | Flockhart et al. | 705/26.1 |
| 8,489,720 B1 * | 7/2013 | Morford et al. | 709/223 |
| 2002/0082881 A1 * | 6/2002 | Price et al. | 705/7 |
| 2003/0167318 A1 * | 9/2003 | Robbin et al. | 709/221 |
| 2004/0220980 A1 | 11/2004 | Forster | |
| 2004/0249859 A1 | 12/2004 | Ward et al. | |
| 2005/0033711 A1 | 2/2005 | Horvitz et al. | |
| 2005/0033982 A1 * | 2/2005 | Paaske | 713/200 |
| 2005/0108144 A1 * | 5/2005 | Longman et al. | 705/37 |
| 2005/0114196 A1 * | 5/2005 | Schoenmeyr | 705/10 |
| 2005/0172138 A1 * | 8/2005 | Ezzat | 713/189 |
| 2005/0182689 A1 * | 8/2005 | Martineau et al. | 705/26 |
| 2005/0197724 A1 * | 9/2005 | Neogi | 700/94 |
| 2006/0095470 A1 | 5/2006 | Cochran et al. | |
| 2006/0229878 A1 * | 10/2006 | Scheirer | 704/273 |
| 2006/0271947 A1 * | 11/2006 | Lienhart et al. | 725/19 |
| 2006/0282304 A1 * | 12/2006 | Bedard et al. | 705/10 |
| 2006/0294164 A1 * | 12/2006 | Armangau et al. | 707/205 |

\* cited by examiner

ARRANGEMENT FOR COMPARING CONTENT IDENTIFIERS OF FILES

FIELD OF THE INVENTION

The invention relates to an arrangement for comparing a content identifier of a file with a content identifier of a further file, to a device comprising such an arrangement, to a method, to a computer program product and to a medium.

Examples of such a file are audio files, video files, audio/video files and data files. Examples of such a content identifier are audio fingerprints, video fingerprints, audio/video fingerprints, global unique identifiers, hash algorithms, cyclic redundancy checks, unique identifiers, titles, file names, file durations, file sizes, album names and artist names. Examples of such a device are consumer products and non-consumer products.

BACKGROUND OF THE INVENTION

US 2004/0249859 A1 discloses a system for fingerprint based media recognition. A media analysis component provides a number and a length of a segment and a fingerprint of the segment, and with this information a media recognition component identifies the media. If a match is not found, additional fingerprints and associated metadata are requested. This all is relatively inflexible.

The known system is disadvantageous owing to the fact that it is relatively inflexible.

SUMMARY OF THE INVENTION

It is an object of the invention, inter alia, to provide an arrangement that is relatively flexible.

A first aspect of the invention provides an arrangement as follows. A comparator compares a content identifier of a file with a content identifier of a further file. By introducing at least one parameter for defining the content identifier, and by introducing a selector for selecting, from a group of two or more content identifiers of the file, in dependence of values of the parameters of these content identifiers, a sub-group of one or more content identifiers of the file, said comparing can be done for the sub-group of content identifiers. As a result, the arrangement is relatively flexible. For a first situation, a first sub-group may be chosen, and for a second situation, a second sub-group may be chosen, according to a pre-stored scheme or in response to a signal from a user or a network operator or a device comprising the arrangement or a further device coupled to the arrangement.

The arrangement is further advantageous in that it, compared to the system disclosed in US 2004/0249859 A1, offers more options.

According to a second an embodiment, a calculator calculates a function of one or more of the values of the parameters of the group of content identifiers and a further comparator compares the function with one or more thresholds. In response to one or more comparison results, the selector is controlled. This way, the selection can be done fully automatically in an optimized way.

According to a third embodiment, the content identifier is defined by first and second parameters. This way, the flexibility is further increased. Two or more different parameters define different features of the content identifier, which further increases a number of options.

According to a fourth embodiment, a calculator calculates a first function of one or more of the values of the first parameters of the group of content identifiers and calculates a second function of one or more of the values of the second parameters of the group of content identifiers and a further comparator compares the first function with one or more first thresholds and compares the second function with one or more second thresholds. In response to one or more comparison results, the selector is controlled. This way, the selection can be done fully automatically in a further optimized way.

The values of the parameters of the content identifiers may be pre-stored in the arrangement or may be supplied to the arrangement by a user or a network operator or a provider or a device comprising the arrangement or a further device coupled to the arrangement. These values may be constant values or may be adaptable values which are to be adapted by the user or the network operator or the provider or the device or the further device.

The thresholds may be pre-stored in the arrangement or may be supplied to the arrangement by the user or the network operator or the provider or the device comprising the arrangement or the further device coupled to the arrangement. These thresholds may be constant thresholds or may be adaptable thresholds which are to be adapted by the user or the network operator or the provider or the device or the further device. The first (second) threshold may therefore be identical to or depend on a calculated value of the second (first) function.

The comparisons, calculations and further comparisons may be performed per file or for a group of two or more files. The values of the parameters of the content identifiers and/or the thresholds may be weighted by weighting factors. Such weighting factors may be pre-stored in the arrangement or may be supplied to the arrangement by the user or the network operator or the provider or the device comprising the arrangement or the further device coupled to the arrangement. These weighting factors may be constant weighting factors or may be adaptable weighting factors which are to be adapted by the user or the network operator or the provider or the device or the further device.

According to a fifth embodiment, the group of content identifiers comprises at least two of a video and/or audio and/or audio/video fingerprint, a global unique identifier, a hash algorithm, a cyclic redundancy check, a unique identifier, a title, a file name, a file duration, a file size, an album name and an artist name.

According to a sixth embodiment, one of the first and second parameters is an accuracy parameter and the other one is a cost parameter, to be able to provide a real balance between accuracies and costs.

A second aspect of the invention provides a device comprising the arrangement of the firest embodiment that may be a device comprising the arrangement or may be a further device coupled to the arrangement. A third aspect of the invention provides a method of comparing the content identifier of a file with a content identifier of another file. A fourth aspect of the invention provides a computer program product for performing the method of the third aspect of the invention. A fifth aspect of the invention provides a medium for performing the method of the third aspect of the invention.

Embodiments of the device, the method, the computer program product and the medium correspond with the embodiments of the arrangement.

An insight might be, that parameters defining content identifiers of files are to be introduced for distinguishing different content identifiers. A basic idea might be, that a selection of a sub-group of one or more content identifiers of a file from a group of two or more content identifiers of the file is to be performed in dependence of values of parameters of these content identifiers.

A problem to provide a relatively flexible arrangement is solved. A further advantage of the arrangement might be, that it offers more options.

These and other aspects of the invention are apparent from and will be elucidated with reference to the embodiments described hereinafter.

DETAILED DESCRIPTION

Figure 1:
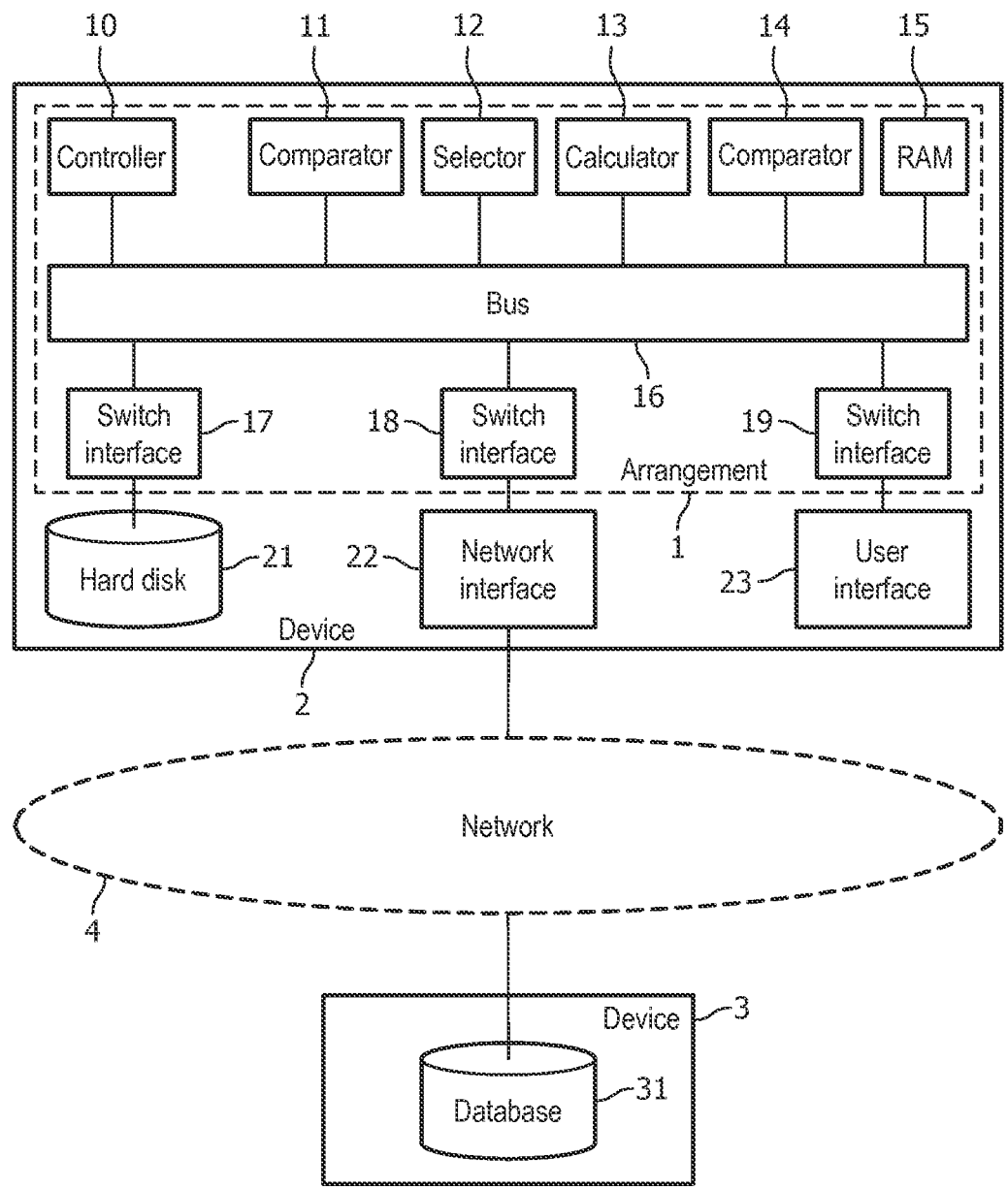
FIG. 1 shows a schematic block diagram of a system comprising a device according to the invention including an arrangement according to the invention and further comprising a further device.

In FIG. 1, a device 2 comprises an arrangement 1 that comprises for example a controller 10, a comparator 11, a selector 12, a calculator 13, a further comparator 14 and a random access memory 15 all coupled to a bus 16 (or a switch 16) that is further coupled to three bus interfaces 17, 18 and 19 (or three switch interfaces 17, 18 and 19). The device 2 further comprises a hard disk 21 coupled to the bus interface 17, a network interface 22 coupled to the bus interface 18, and a user interface 23 coupled to the bus interface 19. The network interface 22 is further coupled via a network 4 to a further device 3 comprising a database 31.

Figure 2:
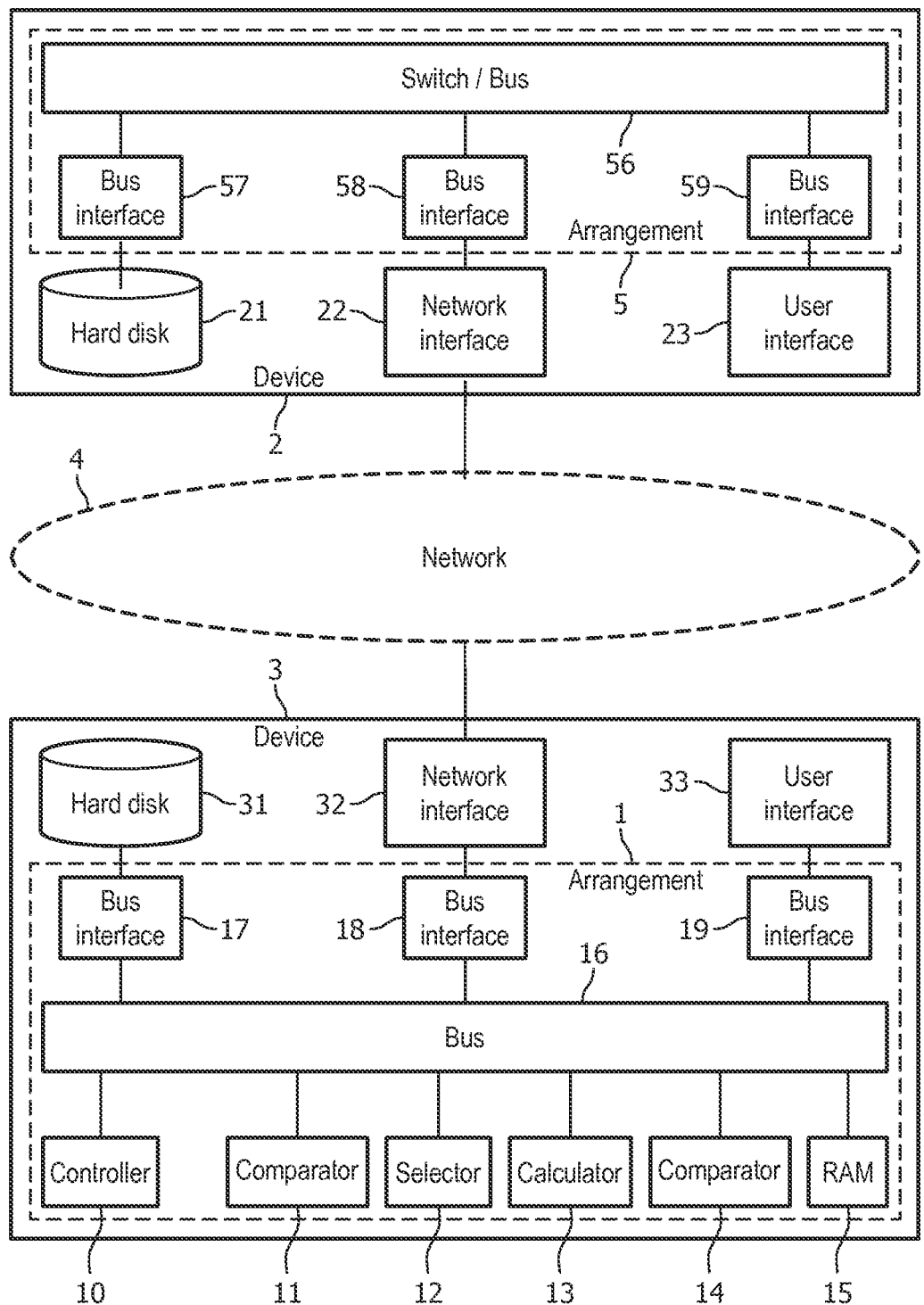
FIG. 2 shows a schematic block diagram of a system comprising a device and further comprising a further device according to the invention including an arrangement according to the invention.

In FIG. 2, a device 2 comprises an arrangement 5 that comprises for example a bus 56 (or a switch 56) that is further coupled to three bus interfaces 57, 58 and 59 (or three switch interfaces 57, 58 and 59). The device 2 further comprises a hard disk 21 coupled to the bus interface 57, a network interface 22 coupled to the bus interface 58, and a user interface 23 coupled to the bus interface 59. The arrangement 5 may further comprise a controller and a random access memory all not shown and coupled to the bus 56.

The further device 3 comprises an arrangement 1 that comprises for example a controller 10, a comparator 11, a selector 12, a calculator 13, a further comparator 14 and a random access memory 15 all coupled to a bus 16 (or a switch 16) that is further coupled to three bus interfaces 17, 18 and 19 (or three switch interfaces 17, 18 and 19). The device 3 further comprises a database 31 coupled to the bus interface 17, a network interface 32 coupled to the bus interface 18, and a user interface 33 coupled to the bus interface 19. The network interface 32 is further coupled via a network 4 to the network interface 22.

In a first situation (FIG. 1), the device 2 is used as a stand alone and comprises many files such as audio files, video files, audio/video files and data files (freeware and/or non-freeware) stored on its hard disk 21. These files are defined by content identifiers such as audio fingerprints, video fingerprints, audio/video fingerprints, global unique identifiers, hash algorithms, cyclic redundancy checks, unique identifiers, titles, file names, file durations, file sizes, album names and/or artist names. Two audio files having the same audio fingerprint are, with a relatively large probability, identical audio files. Two video files having the same title are, with a relatively average probability, identical video files owing to the fact that it is not unlikely that two or more different video files may have the same title. Two data files having the same file duration are, with a relatively small probability, identical data files owing to the fact that it is not unlikely that two or more different data files may have the same file duration etc.

The storage of two or more identical (similar, corresponding) files on a hard disk is inefficient. To be able to remove double files, such double files must be found (detected). Thereto, the comparator 11 compares content identifiers of files with each other. Of course, only content identifiers of the same kind can be compared with each other. So, for example in case of double audio files needing to be found, their audio fingerprints may be compared with each other, their titles may be compared with each other, their file durations may be compared with each other, their album names may be compared with each other and their artist names may be compared with each other etc. The comparisons of content identifiers may for example be done by temporarily storing some or all content identifiers of one kind or of some or all kinds from the hard disk 21 into the random access memory 15 via the bus 16 and by letting the comparator 11 compare the content identifiers per particular kind with each other via the bus 16, all controlled by the controller 10.

To make the arrangement 1 more flexible, and/or to introduce more options, at least one parameter per content identifier of a particular kind is introduced to define this content identifier. The arrangement 1 is provided with a selector 12 for selecting, from a group of at least two content identifiers of a file, in dependence of values of the parameters of the group of content identifiers, a sub-group of at least one content identifier of the file for said comparing. So, for example in case of double audio files needing to be found with a higher probability of success, their audio fingerprints may be compared with each other and their titles may be compared with each other. And for example in case of double audio files needing to be found with a lower probability of success, their file durations may be compared with each other, their album names may be compared with each other and their artist names may be compared with each other. Thereto, the selector 12 is for example controlled by the controller 10, for example in response to pre-stored information or information entered by a user via the user interface 23.

Preferably, but not exclusively, the arrangement 1 is provided with a calculator 13 for calculating a function of one or more of the values of the parameters of the group of content identifiers and with a further comparator 14 for comparing the function with at least one threshold for, in response to at least one comparison result, controlling the selector 12. So, for example in case of double files needing to be found with a predefined probability of success, the content identifiers to be used are calculated. A higher probability for example results in a first content identifier to be used, and a lower probability for example results in second and third content identifiers to be used. Thereto, the selector 12, the calculator 13 and the further comparator 14 are for example controlled by the controller 10, for example in response to pre-stored information or information entered by a user via the user interface 23.

Further preferably, but not exclusively, a content identifier is defined by two or more parameters, such as a cost parameter (processing capacity, time, power, bandwidth) and an accuracy parameter (chance). The arrangement 1 is provided with a calculator 13 for calculating a first function of one or more of the values of the cost parameters of the group of content identifiers and for calculating a second function of one or more of the values of the accuracy parameters of the group of content identifiers and with a further comparator 14 for comparing the first function with at least one first threshold and for comparing the second function with at least one second threshold for, in response to at least one comparison result, controlling the selector 12. So, for example in case of double files needing to be found at predefined maximum costs and at predefined minimum accuracies, the content identifiers to be used are calculated. This for example results in second and third and fourth content identifiers to be used, whereby first and fifth and sixth content identifiers are to be ignored. Thereto, the selector 12, the calculator 13 and the further comparator 14 are for example controlled by the controller 10, for example in response to pre-stored information or information entered by a user via the user interface 23.

An arbitrary overview of content identifiers and their parameters is for example as follows:

|  | Accuracy | Costs |
|---|---|---|
| Audio fingerprint | 1.00 | 20 |
| Global unique identifier | 0.95 | 15 |
| MD5 hash algorithm | 0.90 | 15 |
| Cyclic redundancy check | 0.85 | 10 |
| Unique identifier | 0.80 | 05 |
| Title | 0.60 | 01 |
| File name | 0.60 | 03 |
| File duration | 0.50 | 05 |
| File size | 0.50 | 02 |
| File album | 0.20 | 01 |
| File artist | 0.10 | 01 |

In a second situation (FIG. 1), the device 2 is not used as a stand-alone but is used in combination with the further device 3 that comprises the database 31 with stored files. In this case, for example one or more content identifiers of one or more files stored on the hard disk 21 are to be compared with one or more content identifiers of one or more files stored in the database 31, to determine which files stored in the database 31 may still be interesting to be downloaded into the device 2. Or, for example one or more content identifiers of one or more files stored in the database 31 are to be compared with each other, to find double files inside the database 31 from a remote location, for example to remove such double files.

In a third situation (FIG. 2), the further device 3 comprises the arrangement 1, for example to compare one or more content identifiers of one or more files stored on the hard disk 21 with one or more content identifiers of one or more files stored in the database 31, to determine which files stored in the database 31 may still be interesting to be downloaded into the device 2. Or, for example one or more content identifiers of one or more files stored in the hard disk 21 are to be compared with each other, to find double files inside the hard disk 21 from a remote location, for example to remove such double files. Thereto, the comparator 11, the selector 12, the calculator 13 and the further comparator 14 are for example controlled by the controller 10, for example in response to pre-stored information or information entered by a network operator or a provider via the user interface 33.

The arrangement 1 may for example be a processor memory combination, with the controller 10 being a processor for example comprising the comparators 11 and 14 and the selector 12 and the calculator 13 each in the form of hardware and/or software and with the random access memory 15 being a memory of the combination. Alternatively, the controller 10, the comparators 11 and 14, the selector 12 and the calculator 13 may each be separate hardware and/or software. The network 4 may be a wired and/or wireless network and may comprise sub-networks. Any two blocks shown in the FIGS. 1 and 2 may be combined into a larger block, and each block shown in the FIGS. 1 and 2 may comprise sub-blocks not shown. Usually, a group of at least two content identifiers comprises a number of content identifiers, and a sub-group of at least one content identifier then comprises a reduced number of content identifiers.

So, a scheme may be introduced to balance between cost of finding a match and accuracy of that match. A list of possible content identifiers may be created and a) a measure of accuracy and/or b) a measure of cost in terms of resources used (time, power, bandwidth) may be assigned to these content identifiers. The values may initially, for example, be set by a manufacturer of a device. A user may be allowed to change the factors, for example via weight factors.

Further, with a wish list a user may set (or a device may set for him) a level of match accuracy that is desired for the acquisition of items on the wish list. There is a default value used by the comparing device if the match accuracy is not specified on the wish list. Before a device will try to find in its database content that is on the wish list it may determine a budget. How much effort does it want to spend on this particular comparison action? This may depend on acute resource availability (low power) or on politics (you are my best friend so I go full throttle). The budget may be in terms of total effort or the effort per item.

The process on the device that handles the wish list may balance a desired accuracy with an effort it is willing to spend, via a budget per item, the device tries to find a solution comprising one or more identification methods that together deliver cumulatively the desired accuracy at the lowest cost, if the lowest cost is higher than a threshold the item is dropped and this is reported to an asking device, some method may be cheap and accurate but not applicable due to missing metadata, or via a total budget, the device finds the cheapest solution based on the methods available given the available metadata and executes this solution, it does this for each next item on the list until the budget is spent.

For a resource rich device connected to the power mains (eHub, PC) a budget may typically be very high so one would tend to go for high accuracy. For P2P exchange in the schoolyard one may set a threshold lower. For methods like AFP there are different types of costs. If the AFP for a song is known the effort is in finding a match in the database. If the AFP is not known substantial additional effort goes into generating the AFP. As an extension, one may want to differentiate between the different forms of costs (power, bandwidth) or make the calculation of costs dynamically. The same solution could be applied to other forms of synchronization.

Summarizing, arrangements 1 comprising comparators 11 for comparing content identifiers with each other, such as audio/video fingerprints, unique identifiers, hash algorithms, cyclic redundancy checks, titles, names, durations, sizes, album names and artist names of files such as audio/video/data files, are provided with selectors 12 for selecting, from groups of content identifiers, in dependence of values of parameters of the content identifiers, sub-groups of content identifiers, to increase flexibilities. Calculators 13 calculate functions of the values of the parameters and further comparators 14 compare the functions with thresholds. Content identifiers may be defined by cost and accuracy parameters. Then, calculators 13 calculate first functions of the values of the cost parameters and calculate second functions of the values of the accuracy parameters and further comparators 14 compare the first functions with first thresholds and compare the second functions with second thresholds.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A file comparing device comprising:
   a processor;
   a first comparator for identifying at least two content identifiers of a first file,
   assigning, by a manufacturer, to each of the at least two identified content identifiers of the first file, a cost related parameter value and an accuracy related parameter value,
   wherein the at least one cost related parameter corresponds to a quantitative measure of the cost of expending resources in finding a match between the first file and at least one other file, the expended resource being selected from the group consisting of power, bandwidth, time, and processing capacity,
   wherein the at least one accuracy related parameter corresponds to a quantitative measure of a desired level of match accuracy in finding said match between the first file and the at least one other file;
   a calculator for calculating one or more first functions of the cost related parameter value assigned to one or more of said at least two content identifiers of the first file and for calculating one or more second functions of an accuracy related parameter value assigned to one or more of said at least two content identifiers of the first file,
   a second comparator for comparing the one or more calculated first functions of the cost related parameter with a first threshold and the one or more calculated second function of the accuracy related parameter with a second threshold yielding one or more comparison results, and
   a selector for selecting a sub-group of said at least two content identifiers from said first file is made in response to said one or more comparison results of one of said first or second comparators.

2. A device as claimed in claim 1, the group of content identifiers comprising at least two of a video fingerprint, an audio fingerprint, an audio/video fingerprint, a global unique identifier, a hash algorithm, a cyclic redundancy check, a unique identifier, a title, a file name, a file duration, a file size, an album name and an artist name.

3. A file comparing method comprising the steps of:
   in a processor,
   assigning, by a manufacturer, one or more unique content identifiers to a first file, each unique content identifier being defined by at least one cost related parameter and at least one accuracy related parameter,
   wherein the at least one cost related parameter corresponds to a quantitative measure of the cost of expending resources in finding a match between the first file and at least one other file, the expended resource being selected from the group consisting of power, bandwidth, time, and processing,
   wherein the at least one accuracy related parameter corresponds to a quantitative measure of a desired level of match accuracy in finding said match between the first file and at least one other file;
   calculating a first function of at least one of the cost related parameter values and a second function of the at least one accuracy related parameter values,
   comparing the calculated first function with a first threshold and the second function with a second threshold yielding one or more comparison results, and
   selecting a sub-group of content identifiers from said at least one or more unique content identifiers of said first file is made in response to said one or more comparison results.

4. The file comparing method according to claim 3, where the content identifier is one of an audio fingerprint, a global unique identifier, an MD5 hash algorithm, a title, a file name, a file duration, a file size, a file album and a file artist.

5. A non-transitory computer program storage medium comprising a computer program including a set of instructions executable by a processor, the set of instructions being operable to:
   Assign, by a manufacturer, one or more unique content identifiers to a first file, each unique content identifier being defined by at least one cost related parameter selected from the group consisting of power, bandwidth, time, processing capacity and at least one accuracy related parameter corresponding to a level of match accuracy,
   wherein the at least one cost related parameter corresponds to a quantitative measure of the cost of expending resources in finding a match between the first file and a second file, the expended resource being selected from the group consisting of power, bandwidth, time, and processing,
   wherein the at least one accuracy related parameter corresponds to a quantitative measure of a desired level of match accuracy in finding said match between the first file and the second file;
   calculate a first function of at least one of the cost related parameter values and a second function of the at least one accuracy related parameter values,
   compare the calculated first function with a first threshold and the second function with a second threshold yielding one or more comparison results, and
   select a sub-group of content identifiers from said at least one or more unique content identifiers of said first file is made in response to said one or more comparison results.

6. The non-transitory computer program storage medium according to claim 5, where the content identifier is one of an audio fingerprint, a global unique identifier, an MD5 hash algorithm, a title, a file name, a file duration, a file size, a file album and a file artist.

* * * * *